(12) United States Patent
Miyagi

(10) Patent No.: US 8,305,639 B2
(45) Date of Patent: Nov. 6, 2012

(54) IMAGE PROCESSING APPARATUS, IMAGE PROCESSING METHOD, AND COMPUTER PROGRAM PRODUCT

(75) Inventor: Noriko Miyagi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 690 days.

(21) Appl. No.: 12/502,536

(22) Filed: Jul. 14, 2009

(65) Prior Publication Data

US 2010/0027038 A1 Feb. 4, 2010

(30) Foreign Application Priority Data

Aug. 4, 2008 (JP) ................................ 2008-200375

(51) Int. Cl.
*H04N 1/60* (2006.01)
*H04N 1/46* (2006.01)
*G06K 9/00* (2006.01)

(52) U.S. Cl. ......... 358/1.9; 358/515; 358/537; 358/538; 382/162; 382/167

(58) Field of Classification Search ................... 358/1.9, 358/518, 1.15, 501, 515, 529, 537, 538; 347/115; 399/184; 382/162, 167

See application file for complete search history.

(56) References Cited

U.S. PATENT DOCUMENTS

| | | | | |
|---|---|---|---|---|
| 4,857,955 A | * | 8/1989 | Crandall ......................... | 358/1.9 |
| 5,740,333 A | * | 4/1998 | Yoh et al. ........................ | 358/1.9 |
| 6,035,308 A | * | 3/2000 | Yano et al. ...................... | 715/201 |
| 7,327,874 B2 | | 2/2008 | Shibaki et al. | |
| 7,356,160 B2 | | 4/2008 | Shibaki et al. | |
| 7,403,310 B2 | | 7/2008 | Miyagi et al. | |
| 7,466,453 B2 | | 12/2008 | Miyagi et al. | |
| 7,486,829 B2 | | 2/2009 | Miyagi et al. | |
| 7,535,595 B2 | | 5/2009 | Miyagi et al. | |
| 2004/0165081 A1 | | 8/2004 | Shibaki et al. | |
| 2004/0257622 A1 | | 12/2004 | Shibaki et al. | |
| 2005/0018258 A1 | | 1/2005 | Miyagi et al. | |
| 2005/0018903 A1 | | 1/2005 | Miyagi et al. | |
| 2006/0187246 A1 | | 8/2006 | Miyagi | |
| 2006/0256123 A1 | | 11/2006 | Miyagi | |
| 2006/0274332 A1 | | 12/2006 | Miyagi | |
| 2007/0070466 A1 | * | 3/2007 | Okuyama ....................... | 358/518 |
| 2007/0206228 A1 | | 9/2007 | Miyagi | |
| 2008/0144975 A1 | | 6/2008 | Shibaki et al. | |

(Continued)

FOREIGN PATENT DOCUMENTS

JP 9-289592 11/1997

(Continued)

OTHER PUBLICATIONS

U.S. Appl. No. 12/370,671, filed Feb. 13, 2009, Unknown.

(Continued)

*Primary Examiner* — Charlotte M Baker
(74) *Attorney, Agent, or Firm* — Oblon, Spivak, McClelland, Maier & Neustadt, L.L.P.

(57) ABSTRACT

A determining unit determines a color of a character. A color converting unit converts a chromatic color having a predetermined hue into the predetermined color and a chromatic color having a hue other than the predetermined hue and an achromatic color into a black color. A processing unit processes either one of a color character and a black character determined by the determining unit such that the color character having the chromatic color converted into the black color is relatively noticeable to the black character.

12 Claims, 19 Drawing Sheets

U.S. PATENT DOCUMENTS

2009/0034002 A1 2/2009 Shibaki et al.
2009/0147313 A1 6/2009 Miyagi et al.

FOREIGN PATENT DOCUMENTS

| | | |
|---|---|---|
| JP | 10-224608 | 8/1998 |
| JP | 2002-290761 | 10/2002 |
| JP | 2007-67461 | 3/2007 |
| JP | 2007-68127 | 3/2007 |

OTHER PUBLICATIONS

U.S. Appl. No. 12/318,849, filed Jan. 9, 2009, Unknown.

Japanese Office Action issued Mar. 9, 2012, in Japanese Patent Application No. 2008-200375.

* cited by examiner

FIG. 5

| | |
|---|---|
| PLANE PASSING THROUGH W-K-Y' | $Hy=(Gy-By)R+(By-Ry)G+(Ry-Gy)B=0$ |
| PLANE PASSING THROUGH W-K-G' | $Hg=(Gg-Bg)R+(Bg-Rg)G+(Rg-Gg)B=0$ |
| PLANE PASSING THROUGH W-K-C' | $Hc=(Gc-Bc)R+(Bc-Rc)G+(Rc-Gc)B=0$ |
| PLANE PASSING THROUGH W-K-B' | $Hb=(Gb-Bb)R+(Bm-Rm)G+(Rm-Gm)B=0$ |
| PLANE PASSING THROUGH W-K-M' | $Hm=(Gm-Bm)R+(Bm-Rm)G+(Rm-Gm)B=0$ |
| PLANE PASSING THROUGH W-K-R' | $Hr=(Gr-Br)R+(Br-Rr)G+(Rr-Gr)B=0$ |

FIG. 6

| | |
|---|---|
| Y-G HUE | $Hy<0$ AND $Hg>0$ |
| G-C HUE | $Hg<0$ AND $Hc>0$ |
| C-B HUE | $Hc<0$ AND $Hb>0$ |
| B-M HUE | $Hb<0$ AND $Hm>0$ |
| M-R HUE | $Hm<0$ AND $Hr>0$ |
| R-Y HUE | $Hr<0$ AND $Hy>0$ |
| GRAY HUE | $R=G=B$ |

FIG. 7

| | (R,G,B) | → | (C,M,Y,K) |
|---|---|---|---|
| W | (Rw,Gw,Bw) | | (Cw,Mw,Yw,Kw) |
| K | (Rk,Gk,Bk) | | (Ck,Mk,Yk,Kk) |
| Y' | (Ry,Gy,By) | | (Cy,My,Yy,Ky) |
| G' | (Rg,Gg,Bg) | | (Cg,Mg,Yg,Kg) |
| C' | (Rc,Gc,Bc) | | (Cc,Mc,Yc,Kc) |
| B' | (Rb,Gb,Bb) | | (Cb,Mb,Yb,Kb) |
| M' | (Rm,Gm,Bm) | | (Cm,Mm,Ym,Km) |
| R' | (Rr,Gr,Br) | | (Cr,Mr,Yr,Kr) |

FIG. 8A

| | (R,G,B) → | (C,M,Y,K) | |
|---|---|---|---|
| W | (Rw,Gw,Bw) | (Cw,Mw,Yw,Kw) | BRIGHTNESS CORRECTION VALUE DEPENDING ON HUE |
| K | (Rk,Gk,Bk) | (Ck,Mk,Yk,Kk) × Xk | ⎫ |
| Y' | (Ry,Gy,By) | (Ck,Mk,Yk,Kk) × Xy | ⎬ CONVERT INTO BLACK |
| G' | (Rg,Gg,Bg) | (Ck,Mk,Yk,Kk) × Xg | |
| C' | (Rc,Gc,Bc) | (Ck,Mk,Yk,Kk) × Xc | ⎭ |
| B' | (Rb,Gb,Bb) | (Cb,Mb,Yb,Kb) × Xb | |
| M' | (Rm,Gm,Bm) | (Cr,Mr,Yr,Kr) | ⎱ CONVERT INTO RED |
| R' | (Rr,Gr,Br) | (Cr,Mr,Yr,Kr) | ⎰ |

FIG. 8B

| Xk | 0.7 |
|---|---|
| Xy | 0.3 |
| Xg | 0.5 |
| Xc | 1.0 |
| Xb | 1.0 |

FIG. 9A

| | (R,G,B) → | (C,M,Y,K) | |
|---|---|---|---|
| W | (Rw,Gw,Bw) | (Cw,Mw,Yw,Kw) | |
| K | (Rk,Gk,Bk) | (Ck,Mk,Yk,Kk) × Xk | ⎱ CONVERT INTO BLACK |
| Y' | (Ry,Gy,By) | (Ck,Mk,Yk,Kk) × Xy | |
| G' | (Rg,Gg,Bg) | (Ck,Mk,Yk,Kk) × Xg | ⎰ |
| C' | (Rc,Gc,Bc) | (Cb,Mb,Yb,Kb) | ⎱ CONVERT INTO RED |
| B' | (Rb,Gb,Bb) | (Cb,Mb,Yb,Kb) | ⎰ |
| M' | (Rm,Gm,Bm) | (Ck,Mk,Yk,Kk) × Xm | ⎱ CONVERT INTO BLACK |
| R' | (Rr,Gr,Br) | (Ck,Mk,Yk,Kk) × Xr | ⎰ |

FIG. 9B

| Xk | 0.7 |
|---|---|
| Xy | 0.3 |
| Xg | 0.5 |
| Xm | 1.0 |
| Xr | 1.0 |

FIG. 10A

| | (R,G,B) | → | (C,M,Y,K) | |
|---|---|---|---|---|
| W | (Rw,Gw,Bw) | | (Cw,Mw,Yw,Kw) | |
| K | (Rk,Gk,Bk) | | (Ck,Mk,Yk,Kk) × Xk | ⎫ CONVERT |
| Y' | (Ry,Gy,By) | | (Ck,Mk,Yk,Kk) × Xy | ⎭ INTO BLACK |
| G' | (Rg,Gg,Bg) | | (Cg,Mg,Yg,Kg) × Xg | → CONVERT INTO GREEN |
| C' | (Rc,Gc,Bc) | | (Ck,Mk,Yk,Kk) × Xc | ⎫ |
| B' | (Rb,Gb,Bb) | | (Ck,Mk,Yk,Kk) × Xb | ⎬ CONVERT INTO BLACK |
| M' | (Rm,Gm,Bm) | | (Ck,Mk,Yk,Kk) × Xm | |
| R' | (Rr,Gr,Br) | | (Ck,Mk,Yk,Kk) × Xr | ⎭ |

FIG. 10B

| | |
|---|---|
| Xk | 0.7 |
| Xy | 0.3 |
| Xc | 0.85 |
| Xb | 0.85 |
| Xm | 1.0 |
| Xr | 1.0 |

FIG. 11

| | |
|---|---|
| Xk | (0.30×Rk+0.59×Gk+0.11×Bk)/255 |
| Xy | (0.30×Ry+0.59×Gy+0.11×By)/255 |
| Xg | (0.30×Rg+0.59×Gg+0.11×Bg)/255 |
| Xc | (0.30×Rc+0.59×Gc+0.11×Bc)/255 |
| Xb | (0.30×Rb+0.59×Gb+0.11×Bb)/255 |
| Xm | (0.30×Rm+0.59×Gm+0.11×Bm)/255 |
| Xr | (0.30×Rr+0.59×Gr+0.11×Br)/255 |

FIG. 12
ORIGINAL DOCUMENT DATA
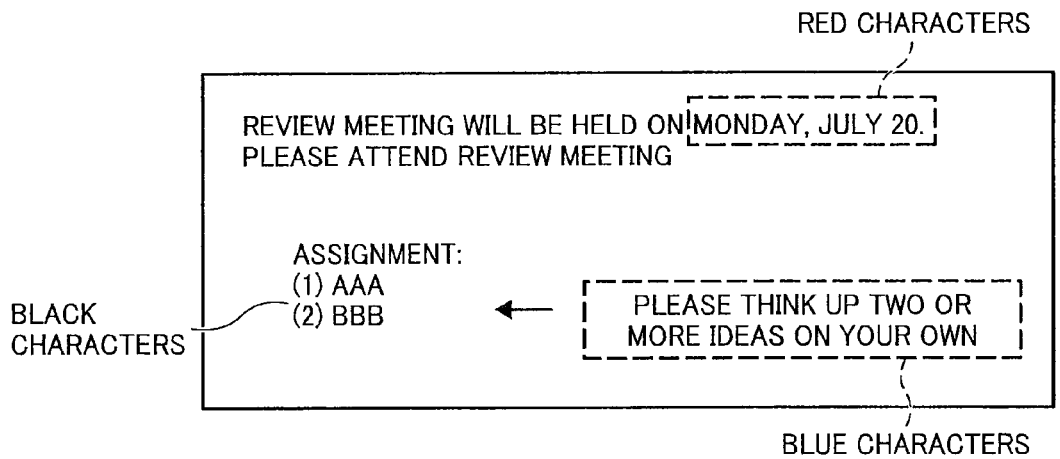
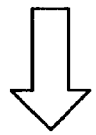
TWO COLORS (BLACK & RED)
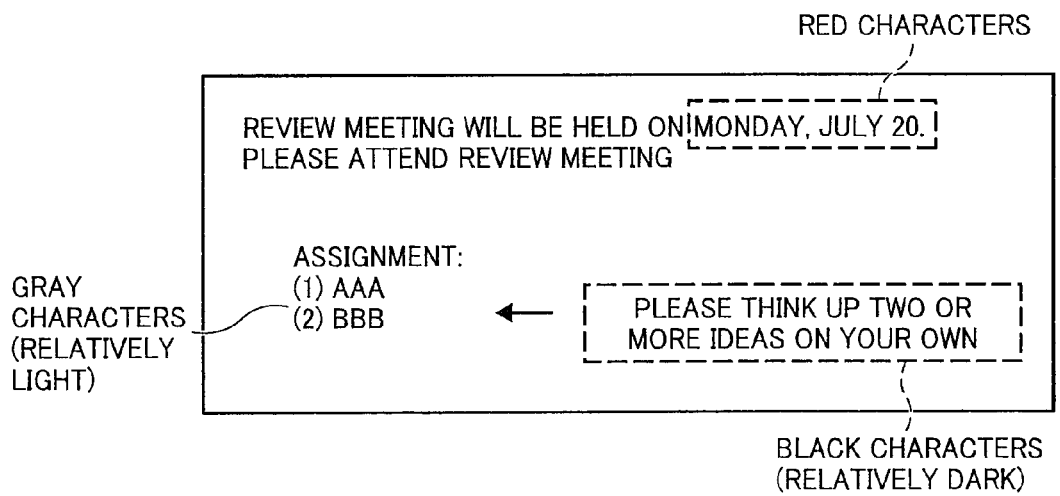

FIG. 14
ORIGINAL DOCUMENT DATA
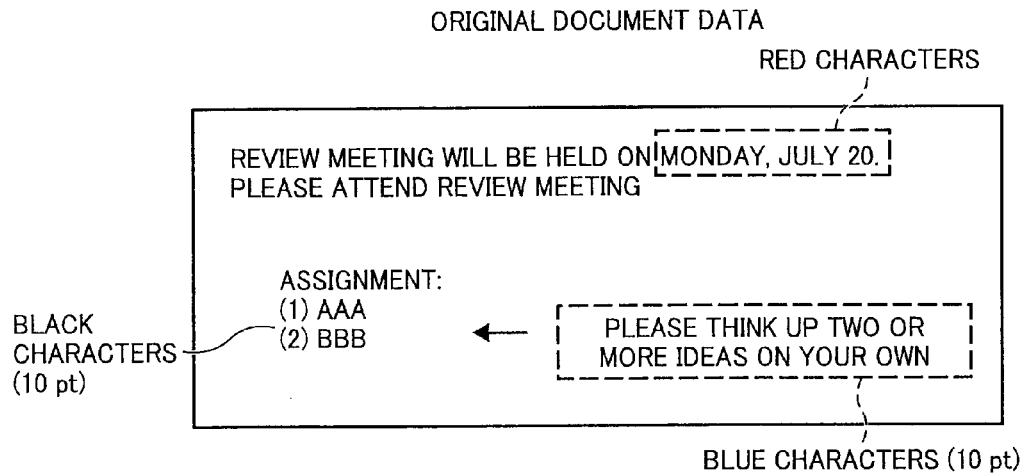
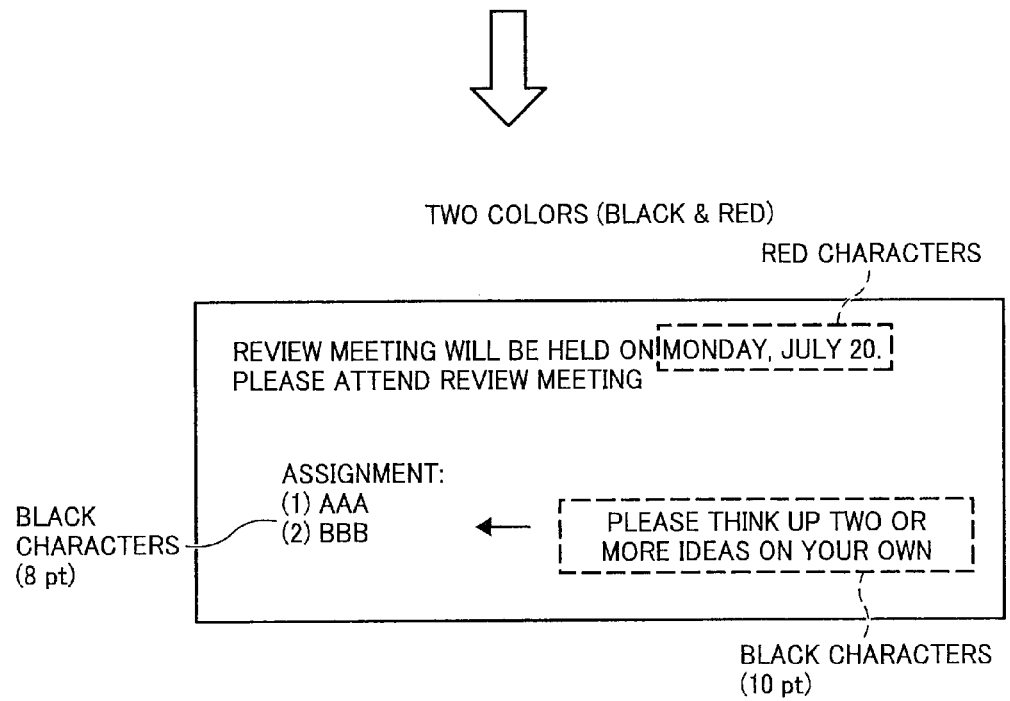
TWO COLORS (BLACK & RED)

FIG. 15
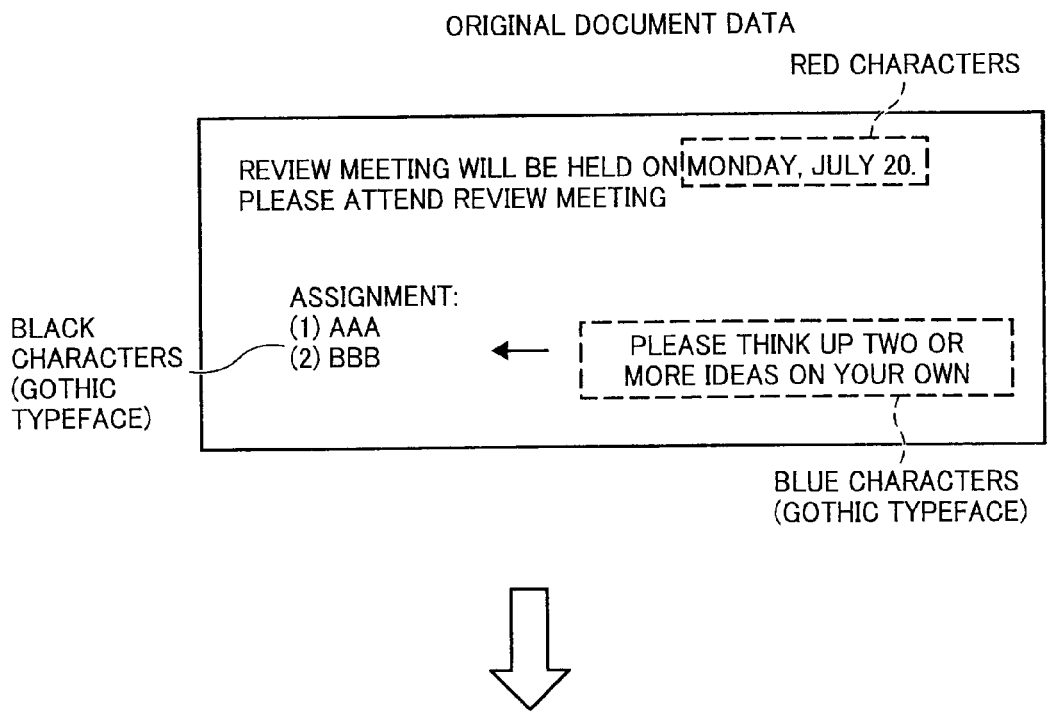
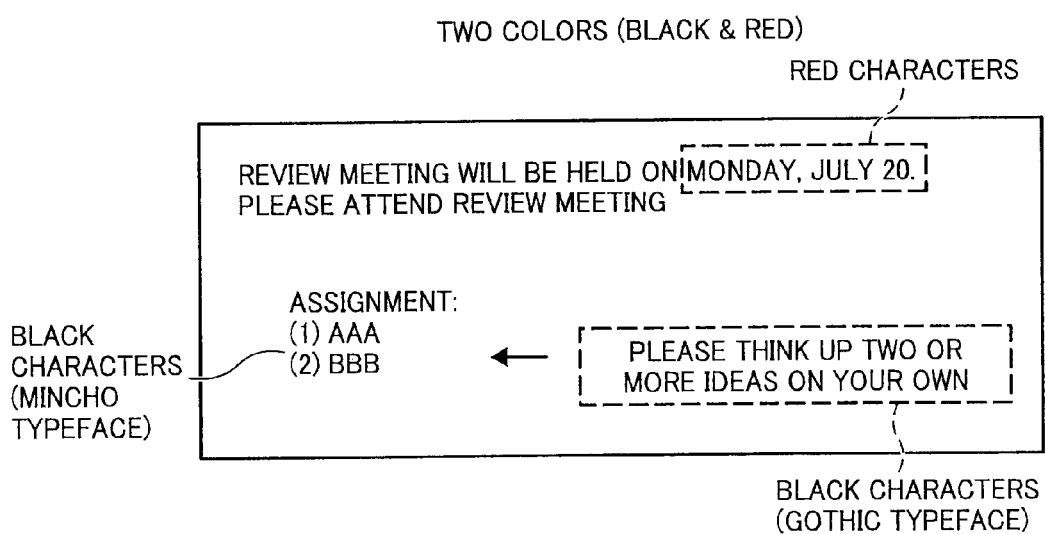

FIG. 16
ORIGINAL DOCUMENT DATA
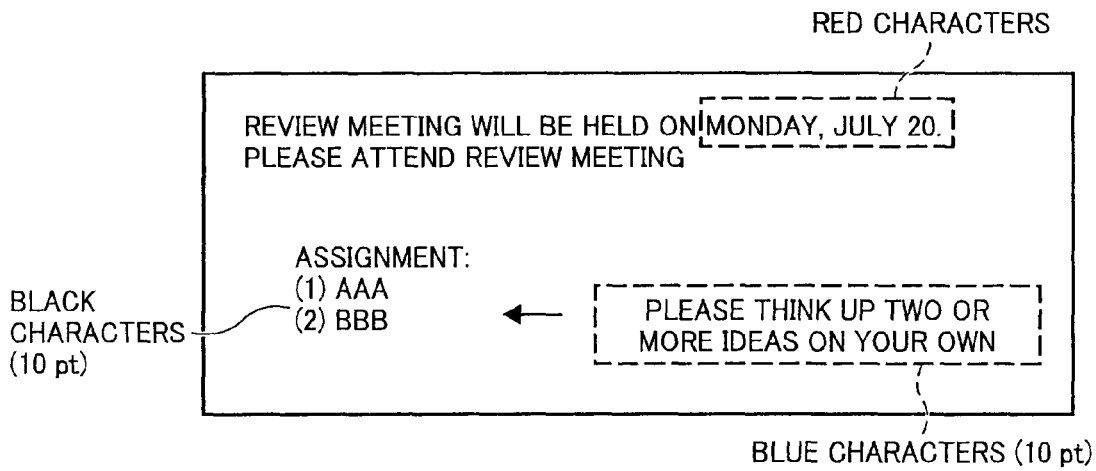
⇩
TWO COLORS (BLACK & RED)
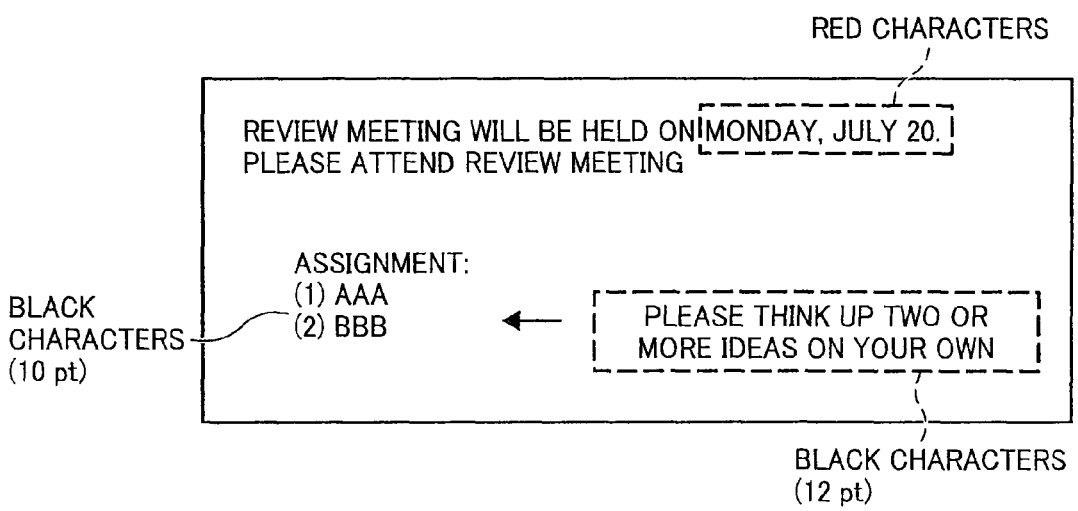

FIG. 17
ORIGINAL DOCUMENT DATA
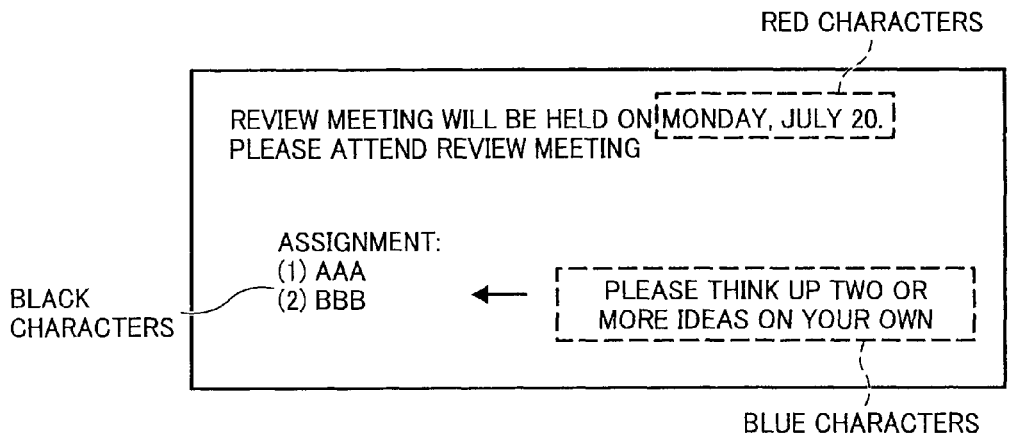
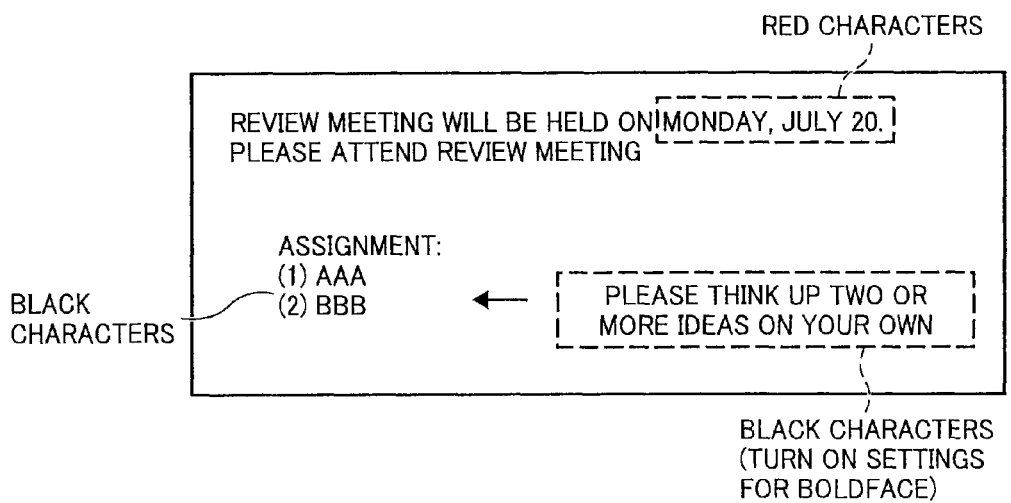

FIG. 18
ORIGINAL DOCUMENT DATA
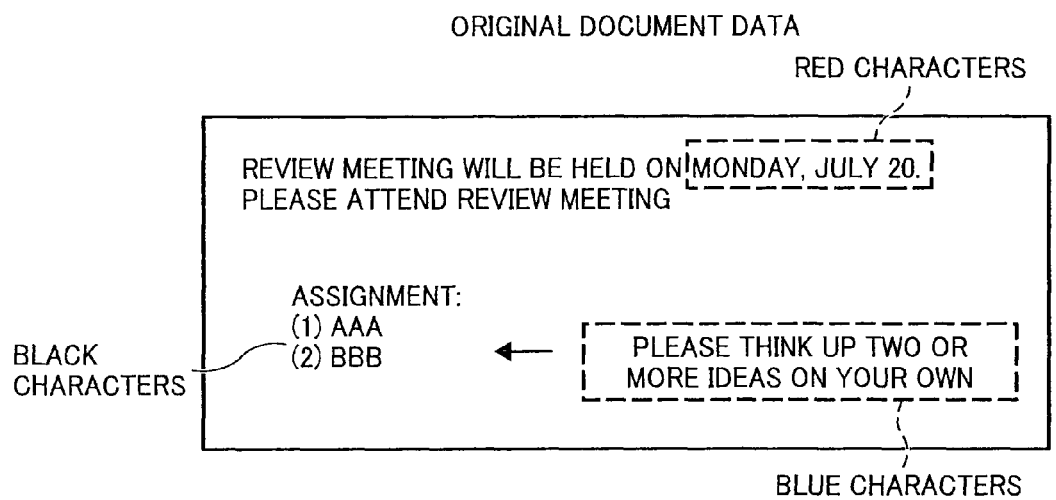
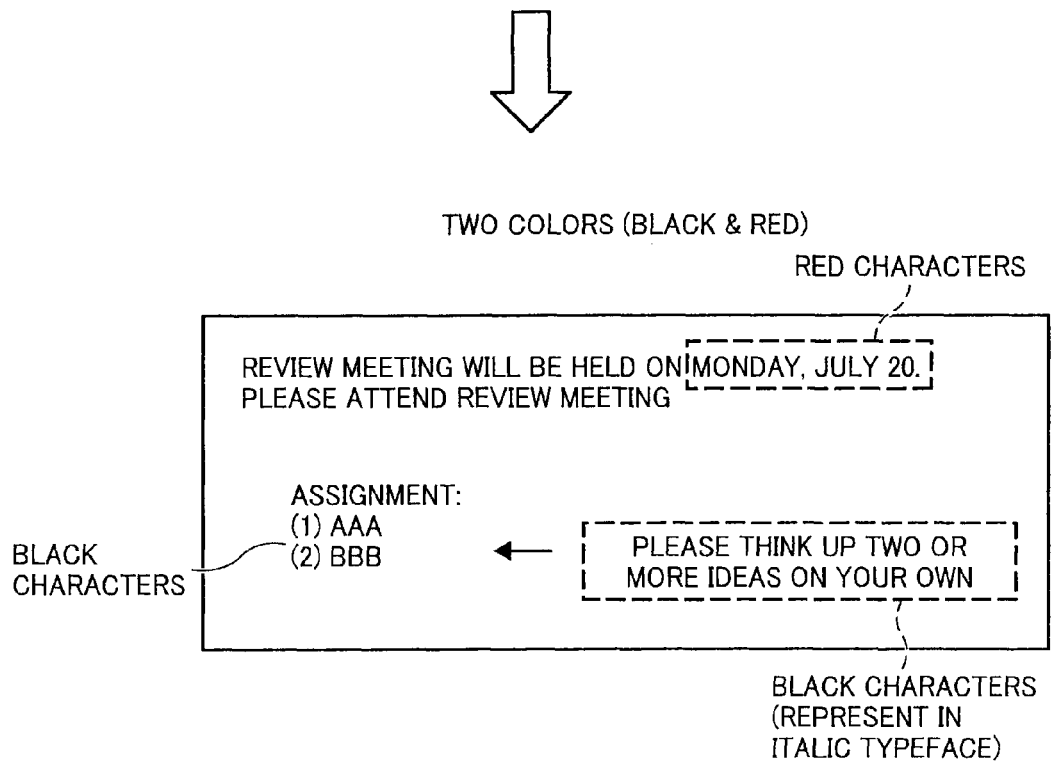

FIG. 19
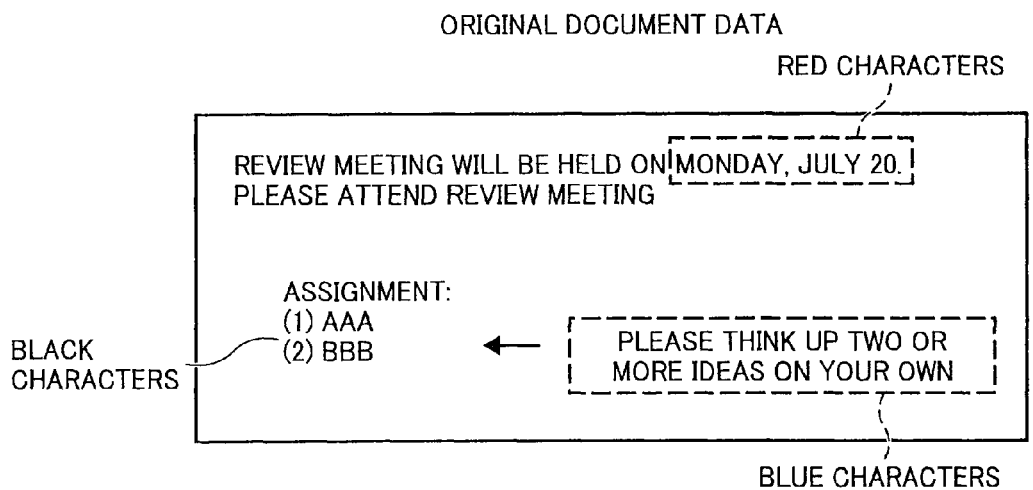
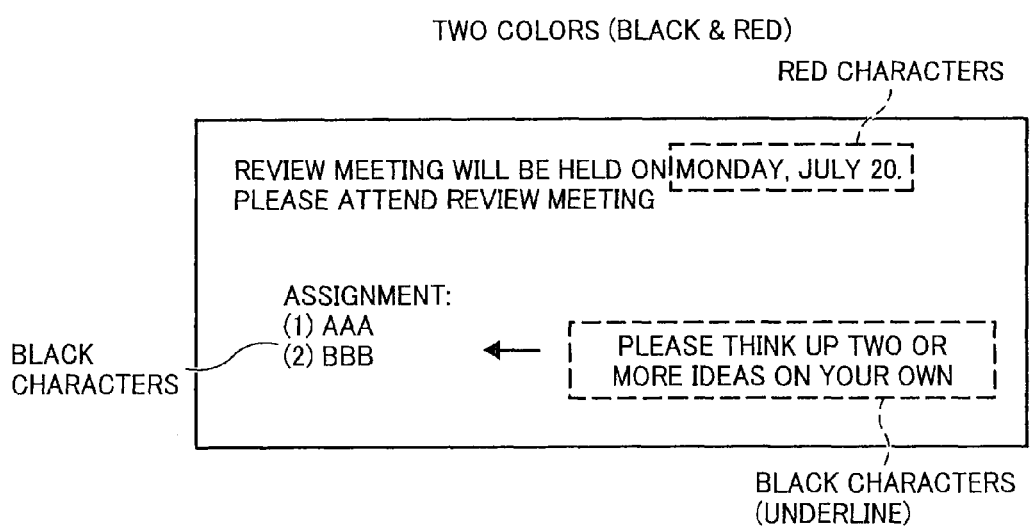

FIG. 20
ORIGINAL DOCUMENT DATA
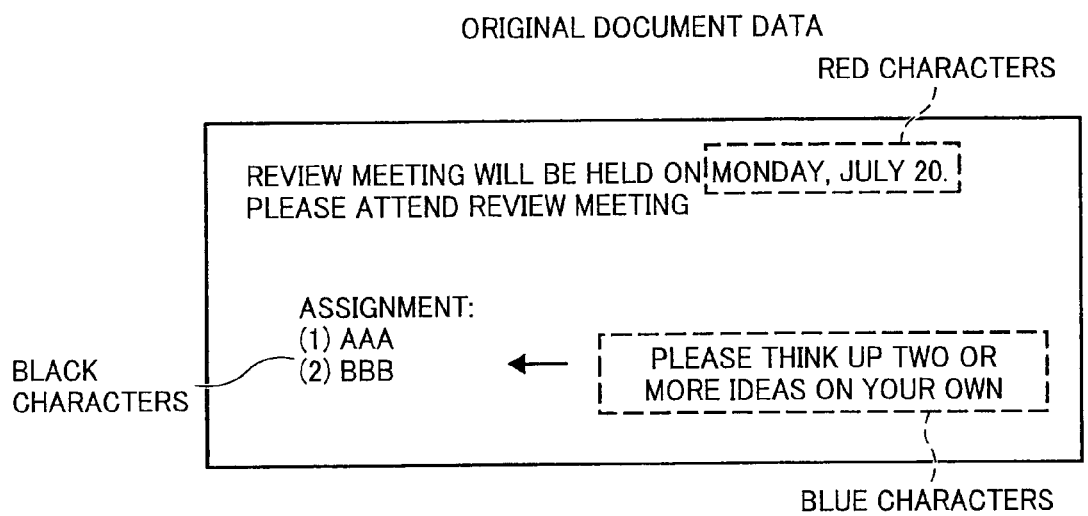
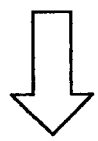
TWO COLORS (BLACK & RED)

FIG. 21
ORIGINAL DOCUMENT DATA
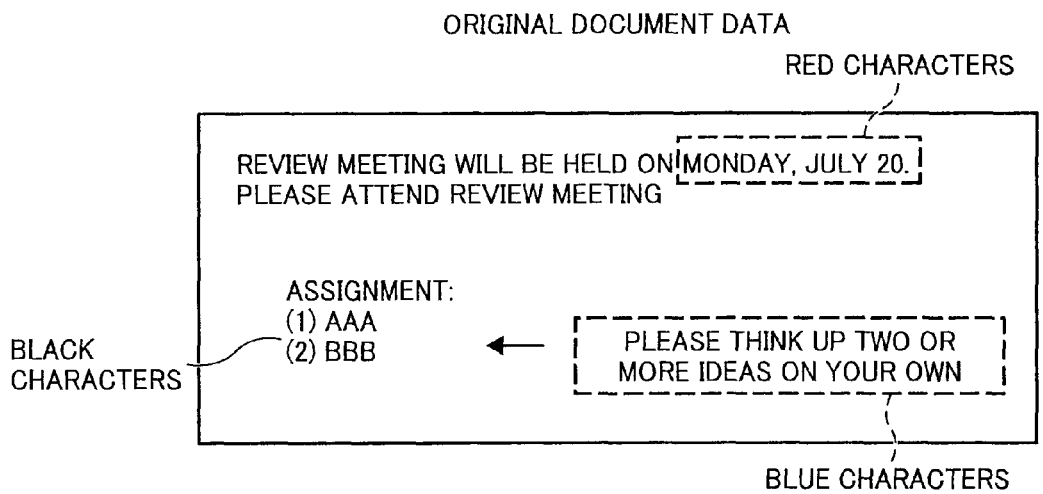
⇩
TWO COLORS (BLACK & RED)
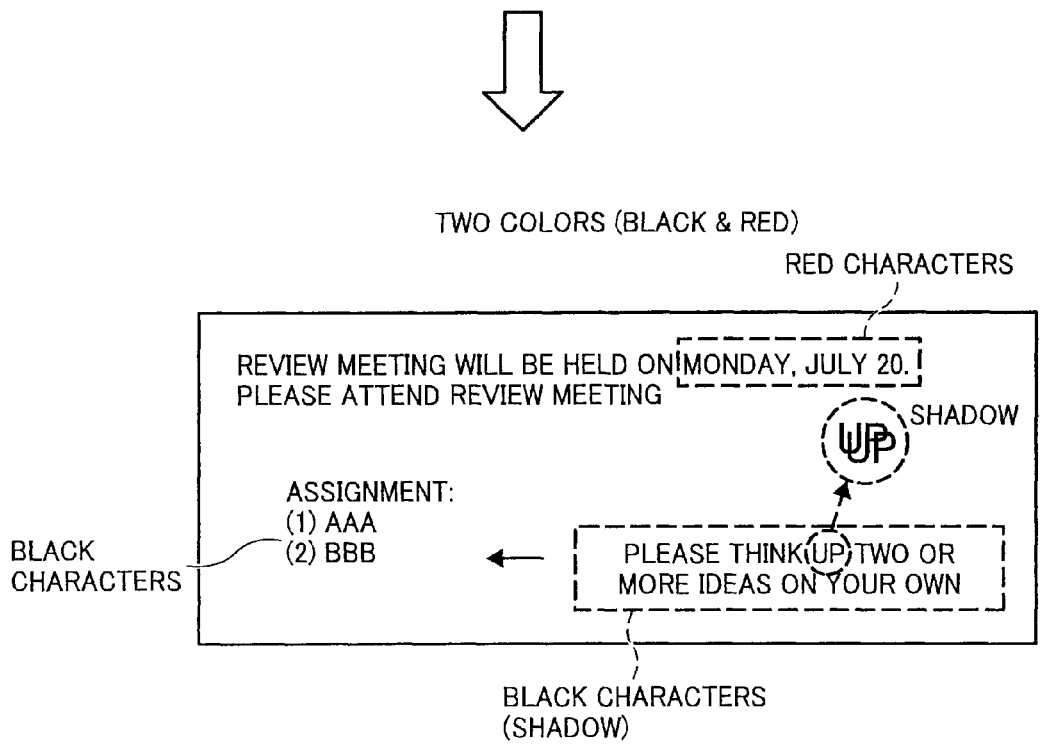

FIG. 24

| Xk | 0.7 |
|----|-----|
| Xy | 0.3 |
| Xg | 0.7 |
| Xc | 1.0 |
| Xb | 1.0 |

FIG. 25

| HUE DETERMINATION RESULT | PROCESSING METHOD EMPLOYED BY PROCESSING UNIT |
|---|---|
| G HUE (YG-G HUE AND G-GC HUE) | REPRESENT IN ITALIC TYPEFACE |
| C HUE (GC-C HUE AND C-CB HUE) | WITHOUT MODIFICATION |
| B HUE (CB-B HUE AND B-BM HUE) | UNDERLINE |
| M HUE (BM-M HUE AND M-MR HUE) | WITHOUT MODIFICATION |
| R HUE (MR-R HUE AND R-RY HUE) | WITHOUT MODIFICATION |
| Y HUE (RY-Y HUE AND Y-YG HUE) | SHADOWING PROCESS |
| GRAY HUE | WITHOUT MODIFICATION |

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2008-200375 filed in Japan on Aug. 4, 2008.

BACKGROUND OF THE INVENTION

1. Field of the Invention

The present invention relates to a technology for converting color data into two-color data having black and other color.

2. Description of the Related Art

Recently, a document often includes characters written in color, for example, to highlight a specific area of the document. One of methods of printing such a document is a two-color print method by which colors of characters included in a document are converted into two colors of black and a different color, for example, red. The two-color print method includes two types of print methods, i.e., a first two-color print method by which a chromatic color is converted into red and an achromatic color is converted into black, and a second two-color print method by which a color having a hue similar to that of red is converted into red and a chromatic color having a hue different from that of red and an achromatic color are converted into black.

It is assumed that an original includes a document image in black characters, red characters, and other color characters written in a different color. Such an original is, for example, a document containing records of a meeting. In the document, an assignment to be done by the next meeting is written in red characters and a topic of the meeting is written in blue characters. Thus, the color characters, i.e., the red characters and the blue characters, can be more noticeable than the black characters thereby highlighting the assignment and the topic, and because the color characters are written in the two colors of red and blue, two different meanings can be indicated by the red characters and the blue characters. Because of improvement in colorization in recent years, a document created by using color characters in a plurality of colors is often used. If such a document is output in two colors by employing the first two-color print method, red characters and color characters written in a different color (the blue characters in the above example) are output in red, and black characters are output in black. Because both the red characters and the blue characters are output in red, it is difficult to recognize the characters originally written in red and the characters originally written in blue on an output image. Japanese Patent Application Laid-open No. H09-289592, Japanese Patent Application Laid-open No. H10-224608, and Japanese Patent Application Laid-open No. 2007-68127 propose technologies for solving the above problem. On the other hand, when the document is output in two colors by employing the second two-color print method, if the color of the color characters is not similar to red (for example, if the color characters are the blue characters), the red characters are output in red and the black characters and the color characters are output in black. Because both the black characters and the color characters are output in black, it is difficult to recognize the characters originally written in black and the characters originally written in the different color on an output image.

The color characters are used in the original because a specific area of a document needs to be highlighted. In the case of the first two-color print method, characters originally written in red are generally represented in darkest and brightest red (pure color) among color characters represented in red. As described in Japanese Patent Application Laid-open No. H10-224608, the red characters are represented in red with a thickly painted pattern. Thus, it is possible to maintain a highlighting effect generated by the red characters, whether it is intentional or not. On the other hand, in the case of the second two-color print method as disclosed in Japanese Patent Application Laid-open No. H09-289592, Japanese Patent Application Laid-open No. H10-224608, or Japanese Patent Application Laid-open No. 2007-68127, or a second two-color print method employed in a currently manufactured product, characters originally written in black are generally represented in darkest black, and it is difficult to maintain the highlighting effect generated by the blue characters. Although it has been considered sufficient to maintain the highlighting effect generated by at least the red characters upon a two-color output in black and red, the highlighting effect generated by the blue characters also needs to be maintained in view of the present situation where a document often includes color characters in a plurality of colors due to the improvement in the colorization. Although it is considered that, due to a request or a fixed concept of a user, the characters originally written in red and black need to be represented in red and black precisely as it is upon the two-color output in black and red, sometimes it is better to output the document in two colors such that the highlighting effect generated by the color characters can be maintained instead of representing the color characters precisely as it is. In the second two-color print method, according to Japanese Patent Application Laid-open No. H09-289592, Japanese Patent Application Laid-open No. H10-224608, and Japanese Patent Application Laid-open No. 2007-68127, although it is possible to represent the black characters such that the user can recognize the characters originally written in black and the characters originally written in a different color, it is difficult to maintain the highlighting effect generated by the characters originally written in the different color.

SUMMARY OF THE INVENTION

It is an object of the present invention to at least partially solve the problems in the conventional technology.

According to one aspect of the present invention, there is provided an image processing apparatus including a determining unit that determines a color of a character, a color converting unit that converts color data into two-color data having a black color and a predetermined color based on the color of the character, and a processing unit that processes either one of a color character and a black character determined by the determining unit. The color converting unit converts a chromatic color having a predetermined hue into the predetermined color and a chromatic color having a hue other than the predetermined hue and an achromatic color into the black color. The processing unit that performs a predetermined process on either one of the color character and the black character such that the color character having the chromatic color converted into the black color is relatively noticeable to the black character.

Furthermore, according to another aspect of the present invention, there is provided an image processing method for an image processing apparatus including a determining unit that determines a color of a character, a color converting unit that converts color data into two-color data having a black color and a predetermined color based on the color of the character, and a processing unit that processes either one of a color character and a black character determined by the determining unit. The image processing method including converting including the color converting unit converting a chromatic color having a predetermined hue into the predetermined color and a chromatic color having a hue other than the predetermined hue and an achromatic color into the black color and processing including the processing unit performing a predetermined process on either one of the color character and the black character such that the color character having the chromatic color converted into the black color is relatively noticeable to the black character.

Moreover, according to still another aspect of the present invention, there is provided a computer program product including a computer usable medium having computer readable program codes embodied in the medium for implementing an image processing method for an image processing apparatus including a determining unit that determines a color of a character, a color converting unit that converts color data into two-color data having a black color and a predetermined color based on the color of the character, and a processing unit that processes either one of a color character and a black character determined by the determining unit. The program codes when executed cause a computer to execute converting including the color converting unit converting a chromatic color having a predetermined hue into the predetermined color and a chromatic color having a hue other than the predetermined hue and an achromatic color into the black color and processing including the processing unit performing a predetermined process on either one of the color character and the black character such that the color character having the chromatic color converted into the black color is relatively noticeable to the black character.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a list of equations of planes each passing through control points shown in FIG. 4 corresponding to each hue boundary;

FIG. 6 is a list of hue determination conditions according to the first embodiment;

FIG. 7 is a table for explaining CMYK conversion values at each of the control points for full-color output;

FIG. 8A is a table for explaining the CMYK conversion values at each of the control points for two-color output in black and red, and FIG. 8B is a table for explaining brightness correction values depending on the hue for the two-color output in black and red;

FIG. 9A is a table for explaining the CMYK conversion values at each of the control points for the two-color output in black and blue, and FIG. 9B is a table for explaining brightness correction values depending on the hue for the two-color output in black and blue;

FIG. 10A is a table for explaining the CMYK conversion values at each of the control points for the two-color output in black and green, and FIG. 10B is a table for explaining brightness correction values depending on the hue for the two-color output in black and green;

FIG. 11 is a table for explaining brightness correction values depending on the hue according to the first embodiment;

FIG. 12 is a schematic diagram for explaining an example of processing performed by the image processing apparatus according to the first embodiment;

FIGS. 14 to 21 are schematic diagrams for explaining examples of processing performed by the image processing apparatus according to the second embodiment;

FIG. 24 is a table for explaining brightness correction values applied to a character object upon density correction performed by the color and density correcting unit according to the third embodiment;

FIG. 25 is a table for explaining processing methods employed by a processing unit shown in FIG. 22 depending on a hue determination result;

DETAILED DESCRIPTION OF THE PREFERRED EMBODIMENTS

Exemplary embodiments of the present invention are explained in detail below with reference to the accompanying drawings.

Figure 1:
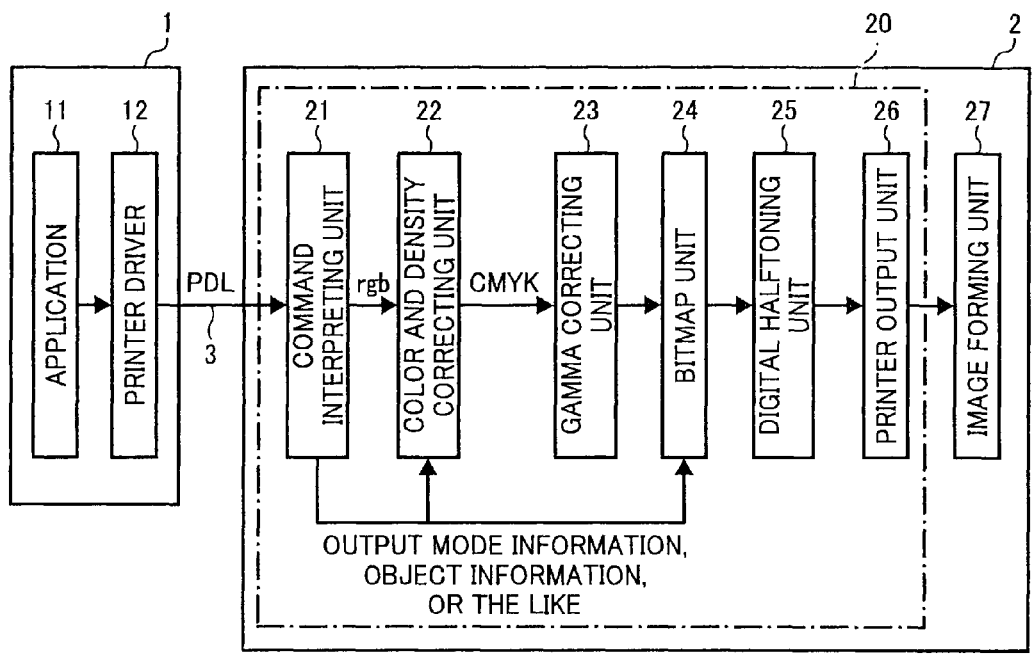
FIG. 1 is a block diagram of an image forming system including a printer having an image processing apparatus according to a first embodiment of the present invention.
Figure 2:
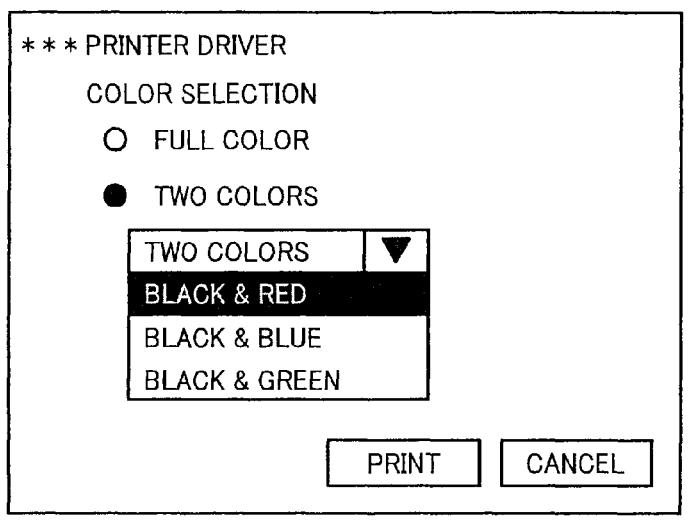
FIG. 2 is a schematic diagram of a menu of a printer driver shown in FIG. 1 displayed on a screen of a host computer shown in FIG. 1.

FIG. 1 is a block diagram of an image forming system including a printer 2 having an image processing apparatus 20 according to a first embodiment of the present invention. The image forming system includes a host computer 1 and the printer 2 that are connected to each other via a local area network (LAN) 3. In the image forming system having the above configuration, when a user creates a document and instructs execution of printing of the document in an application 11 on the host computer 1, the created document is converted by a printer driver 12 included in the host computer 1 into page description language (PDL) data that can be interpreted by the printer 2, and the converted data is transmitted to the printer 2 via the LAN 3. FIG. 2 is a schematic diagram of a menu of the printer driver 12 displayed on a screen of the host computer 1. When the user instructs execution of the printing, the menu of the printer driver 12 is displayed on the screen of the host computer 1, so that the user can select an output mode, either full-color output or two-color output. If the user selects the two-color output, the user also specifies which color is to be used with black. It is explained in the first embodiment that the user selects one of three combinations, i.e., black and red, black and blue, and black and green. The printer driver 12 describes output mode information selected by the user in the PDL.

A command interpreting unit 21 included in the printer 2 interprets the PDL transmitted from the printer driver 12 thereby obtaining, as a draw command, object information (a character, graphic, or image), the position or the size of an object, a color of the object (whether the object is colored or monochrome), a signal value (rgb values if the object is colored, or a Gray value if the object is monochrome), or character attribute information such as a font if the object is a character. The command interpreting unit 21 also obtains the output mode information. The command interpreting unit 21 sends the obtained information to a subsequent processing block. Each of the r, g, b, and Gray values has a value from 0 to 255, and has the value of 255 for white.

Figure 3:
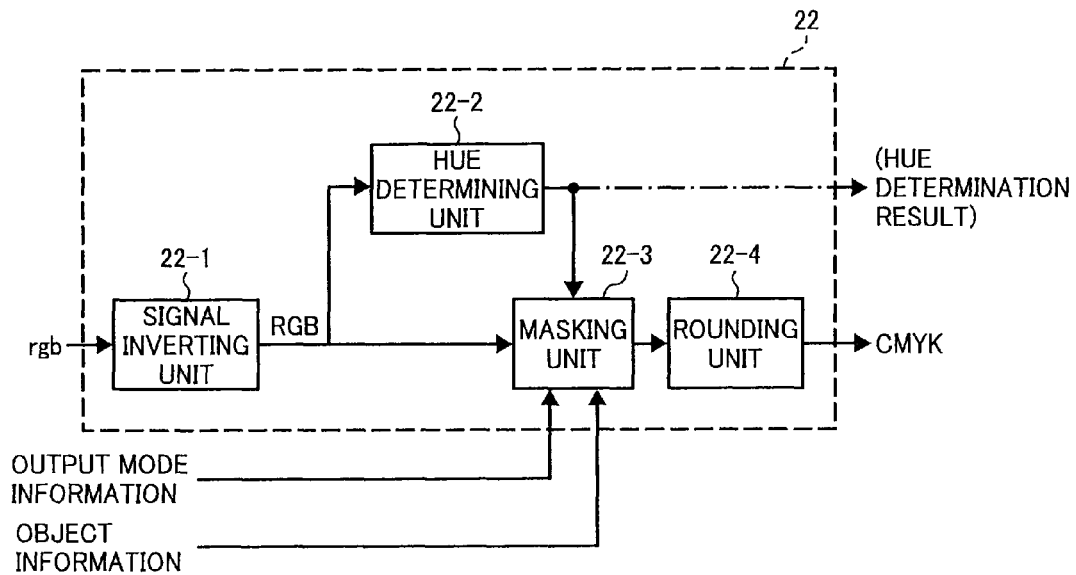
FIG. 3 is a block diagram of a color and density correcting unit shown in FIG. 1.

A color and density correcting unit 22 included in the printer 2 selects a color correction operation in a manner as described below depending on the output mode (whether the output mode is a full-color output mode or a two-color output mode, and if it is the two-color output mode, which color is to be used with black), the object information (whether the object is a character object), and a color of the object (whether the object is colored or monochrome). FIG. 3 is a block diagram of the color and density correcting unit 22 if the object is colored. The color and density correcting unit 22 performs density correction only if the output mode is the two-color output mode and the object is the character object.

If the output mode is the full-color output mode and the object is colored, a signal inverting unit 22-1 included in the color and density correcting unit 22 inverts the rgb values (R=255−r, G=255−g, and B=255−b) thereby obtaining RGB values, a hue determining unit 22-2 included in the color and density correcting unit 22 determines a hue based on the RGB values, and a masking unit 22-3 included in the color and density correcting unit 22 performs a masking operation.

Figure 4:
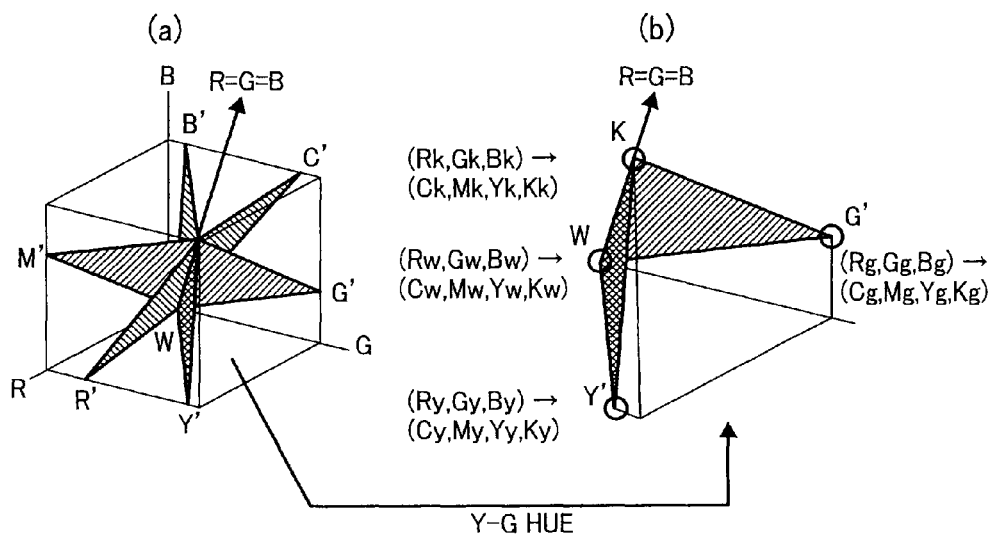
FIG. 4 is a schematic diagram for explaining determination as to which one of six divided areas in an RGB three-dimensional space includes input RGB values according to the first embodiment.

FIG. 4 is a schematic diagram for explaining determination as to which one of six divided areas in an RGB three-dimensional space includes input RGB values. As shown in (a) of FIG. 4, the RGB three-dimensional space is divided into the six areas at eight control points K, W, R', G', B', C', M', and Y'. For example, if the divided area defined by the control points K, W, Y', and G' includes the input RGB values, it is determined that a Y-G hue includes the input RGB values. FIG. 5 is a list of equations of planes each passing through the control points W, K and one other control point corresponding to each hue boundary. The RGB values of the control point W are determined as (Rw, Gw, Bw)=(0, 0, 0), and the RGB values of the control point K are determined as (Rk, Gk, Bk)=(255, 255, 255). The RGB values of a control point X' is represented as Rx, Gx, and Bx. FIG. 6 is a list of hue determination conditions. It is determined which hue includes the input RGB values by using the hue determination conditions based on the equations of the planes corresponding to the respective hue boundaries. If R=G=B, it is determined that the Gray hue includes the input RGB values.

FIG. 7 is a table for explaining CMYK conversion values at each of the control points W, K, Y', G', C', B', M', and R' for the full-color output. The masking unit 22-3 sets the CMYK conversion values at each of the control points W, K, Y', G', C', B', M', and R' in advance and performs a masking operation according to Equation (1) described below by selecting a masking coefficient for each of the hues based on the CMYK conversion values.

$$\begin{bmatrix} C \\ M \\ Y \\ K \end{bmatrix} = \begin{bmatrix} M_{11} & M_{12} & M_{13} & M_{14} \\ M_{21} & M_{22} & M_{23} & M_{24} \\ M_{31} & M_{32} & M_{33} & M_{34} \\ M_{41} & M_{42} & M_{43} & M_{44} \end{bmatrix} \begin{bmatrix} R \\ G \\ B \\ I \end{bmatrix} \quad (1)$$

The masking operation is performed by the same method as that described in Japanese Patent Application Laid-open No. 2002-290761. Masking coefficients $M_{11}$ to $M_{44}$ are determined in advance for each of the hues. As shown in (b) of FIG. 4, for example, the masking coefficient of the Y-G hue can be determined based on the RGB values and the CMYK conversion values at the control points W, K, G', and Y'. In the case of the Gray hue, the same result can be obtained even if the masking coefficients of any other hues are used. Specifically, because the result is the same as that obtained by a linear interpolation operation performed between the control points W and K, it can be determined in advance that the masking coefficient of, for example, the Y-G hue is to be used. If a result of the masking operation is smaller than 0, a rounding unit 22-4 included in the color and density correcting unit 22 corrects the result to be 0, and if the result is larger than 255, the rounding unit 22-4 corrects the result to be 255.

If the output mode is the full-color output mode and the object is monochrome, a value obtained by inverting the Gray value is output as the K value (K=255−Gray) and zero is output as the CMY values (C=M=Y=0).

FIG. 8A is a table for explaining the CMYK conversion values at each of the control points W, K, Y', G', C', B', M', and R' for the two-color output in black and red, and FIG. 8B is a table for explaining brightness correction values depending on the hue for the two-color output in black and red. FIG. 9A is a table for explaining the CMYK conversion values at each of the control points W, K, Y', G', C', B', M', and R' for the two-color output in black and blue, and FIG. 9B is a table for explaining brightness correction values depending on the hue for the two-color output in black and blue. FIG. 10A is a table for explaining the CMYK conversion values at each of the control points W, K, Y', G', C', B', M', and R' for the two-color output in black and green, and FIG. 10B is a table for explaining brightness correction values depending on the hue for the two-color output in black and green. If the output mode is the two-color output mode and the character object and the object are colored, color correction values at the control points W, K, Y', G', C', B', M', and R' are determined as shown in FIGS. 8A, 9A, and 10A depending on the selected colors (black and red, black and blue, or black and green) for the two-color output, and the brightness correction values shown in FIGS. 8B, 9B, and 10B are applied depending on the hue. The masking operation is performed by using the masking coefficient determined in the above manner.

If the output mode is the two-color output mode and the character object and the object are monochrome, a value obtained by inverting the Gray value is multiplied by the brightness correction value Xk shown in FIGS. 8B, 9B, or 10B, and a value obtained as a result of the multiplication is output as the K value (K=(255−Gray)×Xk) and zero is output as the CMY values (C=M=Y=0).

As described above, an operation performed by applying the brightness correction value in the case of the character object corresponds to the density correction. In the case of the character object, the brightness correction value is selected depending on a determination result obtained by the hue determining unit 22-2 and then the density correction is performed. Thus, the color of the character is determined and the density correction is performed depending on the determined color of the character.

FIG. 11 is a table for explaining brightness correction values depending on the hue. If the output mode is the two-color output mode and an object other than the character object is colored, the color correction values at the control points W, K, Y', G', C', B', M', and R' are determined as shown in FIGS. 8A, 9A, and 10A, and the brightness correction values shown in FIG. 11 are applied depending on the hue. The masking operation is performed by using the masking coefficient determined in the above manner.

If the output mode is the two-color output mode and the object other than the character object is monochrome, a value obtained by inverting the Gray value is output as the K value (K=255-Gray) and zero is output as the CMY values (C=M=Y=0).

Thus, an operation similar to a conventional operation for the two-color output is performed on the object other than the character object, so that an object originally written in black is output in darkest black after the color correction.

A gamma correcting unit 23 included in the printer 2 performs transformation to correct gamma characteristics of the printer 2 by using a preliminarily set gamma transformation table. The gamma transformation table is a look-up table in which a value from 0 to 255 is input for each of the C, M, Y, and K values and a value from 0 to 255 is output. A bitmap unit 24 included in the printer 2 expands the draw command thereby generating a bitmapped image. Furthermore, a digital halftoning unit 25 included in the printer 2 performs digital halftoning to represent the density based on pulse-surface-area modulation by reducing the number of bits and using a plurality of dots. A dither process is performed to convert an image having eight bits for each of the CMYK into an image having two bits for each of the CMYK. A printer output unit 26 included in the printer 2 outputs the image on which the dither process has been performed to an image forming unit 27 included in the printer 2 in which a color material is to be placed on a recording medium.

FIG. 12 is a schematic diagram for explaining an example of processing performed by the image processing apparatus 20. As described above, when a document including black, red, and blue characters is output in two colors of black and red, the red characters are represented in red without modification, the blue characters are represented in darker black that the black characters, and the black characters are represented in relatively light black (gray). Therefore, it is possible to maintain the highlighting effect generated by the blue characters represented in black as well as the highlighting effect generated by the red characters represented in red. Moreover, because the density of the block characters is reduced, it is effective in saving a color material used at portions corresponding to the black characters, and it is possible to achieve an effect of saving the color material in a generally used document that contains more black characters than color characters as a whole.

Although it used to be important to output the black characters thickly and clearly, nowadays it is possible to obtain satisfactory image equality and legibility of the black characters even if the density of the black characters is reduced to a certain degree to output gray characters due to a high resolution achieved by an output device. Because of the improvement in performance of the output device, it is possible to actually implement the configuration according to the first embodiment in which the density correction is performed so that an area highlighted by the color characters converted into the black characters is still recognized as the highlighted area upon the two-color output while the quality of the black characters is maintained at a sufficiently acceptable level.

Figure 13:
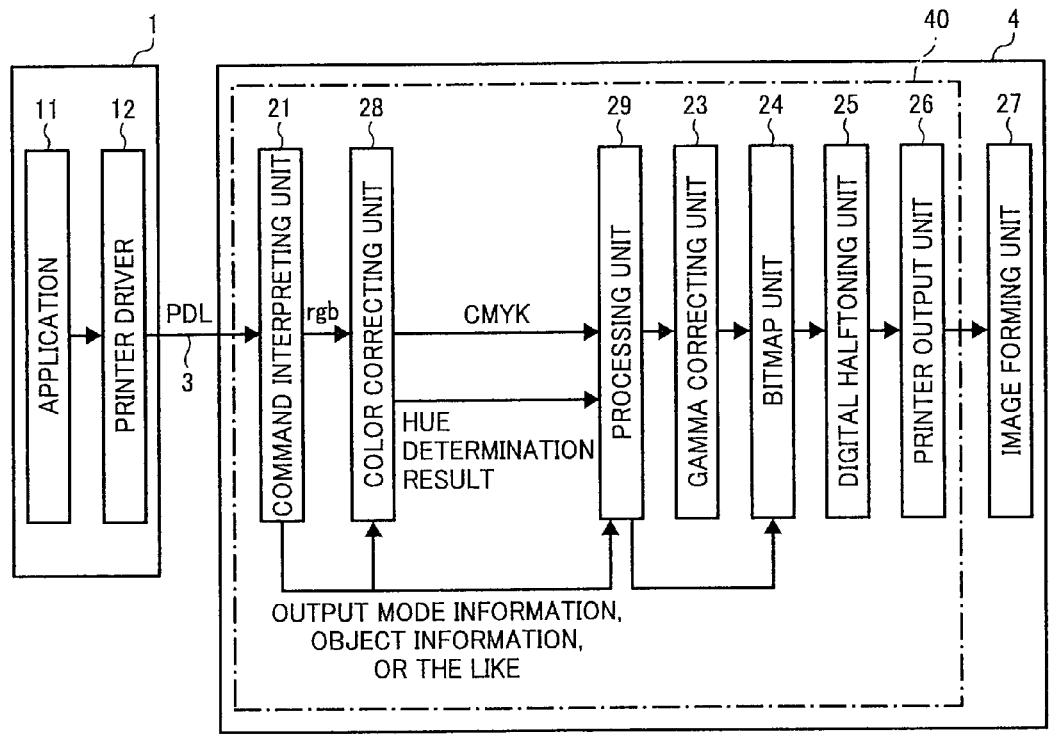
FIG. 13 is a block diagram of an image forming system including a printer having an image processing apparatus according to a second embodiment of the present invention.

FIG. 13 is a block diagram of an image forming system including a printer 4 having an image processing apparatus 40 according to a second embodiment of the present invention. The same components are indicated with the same reference numerals as those shown in FIG. 1. The image forming system according to the second embodiment is different from the image forming system according to the first embodiment on the points described below. Specifically, a color correcting unit 28 included in the image processing apparatus 40 performs only the color correction and does not perform the density correction. The brightness correction values shown in FIG. 11 are always applied for the hues upon the two-color output. Thus, the density correction is not actually performed. In the second embodiment, instead of the density correction, a processing unit 29 included in the printer 4 performs a processing operation other than the density correction on the black characters or the color characters upon the two-color output.

FIGS. 14 to 21 are schematic diagrams for explaining examples of processing performed by the image processing apparatus 40. In a first example of the processing of the black characters as shown in FIG. 14, the size of the black characters is reduced, so that the size of the color characters converted into the black characters is relatively large whereby the color characters can be noticeable. Furthermore, in a second example of the processing of the black characters as shown in FIG. 15, the thickness of the black characters is reduced, so that the color characters converted into the black characters are relatively thick whereby the color characters can be noticeable. To reduce the thickness of the characters, for example, a typeface of the characters can be changed such that only the black characters originally written in the gothic typeface are converted into the black characters written in the mincho typeface as shown in FIG. 15, or if the characters are originally written in boldface, the settings for writing the characters in boldface can be turned off. Alternatively, although a processing load becomes large, it is possible to perform a thinning process by each pixel after processing performed by the bitmap unit 24.

In a first example of the processing of the color characters converted into the black characters as shown in FIG. 16, the size of the color characters converted into the black characters is increased, so that the color characters can be noticeable. Furthermore, in a second example of the processing of the color characters converted into the black characters as shown in FIG. 17, the thickness of the color characters converted into the black characters is increased, so that the color characters can be noticeable. Although there are various ways to change the thickness of the characters as described above, the simplest and most effective way is to turn on the settings for writing the characters in boldface as shown in FIG. 17. Moreover, in a third example of the processing of the color characters converted into the black characters as shown in FIG. 18, the color characters converted into the black characters are represented in the italic typeface, so that the color characters can be noticeable. In a fourth example of the processing of the color characters converted into the black characters as shown in FIG. 19, the color characters converted into the black characters are underlined, so that the color characters can be noticeable. Furthermore, in a fifth example of the processing of the color characters converted into the black characters as shown in FIG. 20, a shading pattern is added to a background of the color characters converted into the black characters, so that the color characters can be noticeable. Moreover, in a sixth example of the processing of the color characters converted into the black characters as shown in FIG. 21, a shadow is added to the color characters converted into the black characters, so that the color characters can be noticeable.

The processing unit 29 rewrites information (a character size, settings for writing in boldface, a typeface, or the like) about the character object sent from the command interpreting unit 21 depending on a processing method and sends the rewritten information to the bitmap unit 24.

As described above, the size or the thickness of the black characters or the color characters converted into the black characters is modified so that the color characters are noticeable, or the color characters converted into the black characters are represented in the italic typeface, or the like, so that the color characters are noticeable. Thus, even upon the two-color output, it is possible to maintain the highlighting effect generated by the color characters converted into the black characters as well as the highlighting effect generated by the color characters converted into the characters in a color other than black. Furthermore, if the size or the thickness of the black characters is reduced, it is effective in reducing the color material to be used at portions corresponding to the black characters, and it is possible to achieve the effect of saving the color material in a generally used document that contains more black characters than color characters as a whole.

Figure 22:
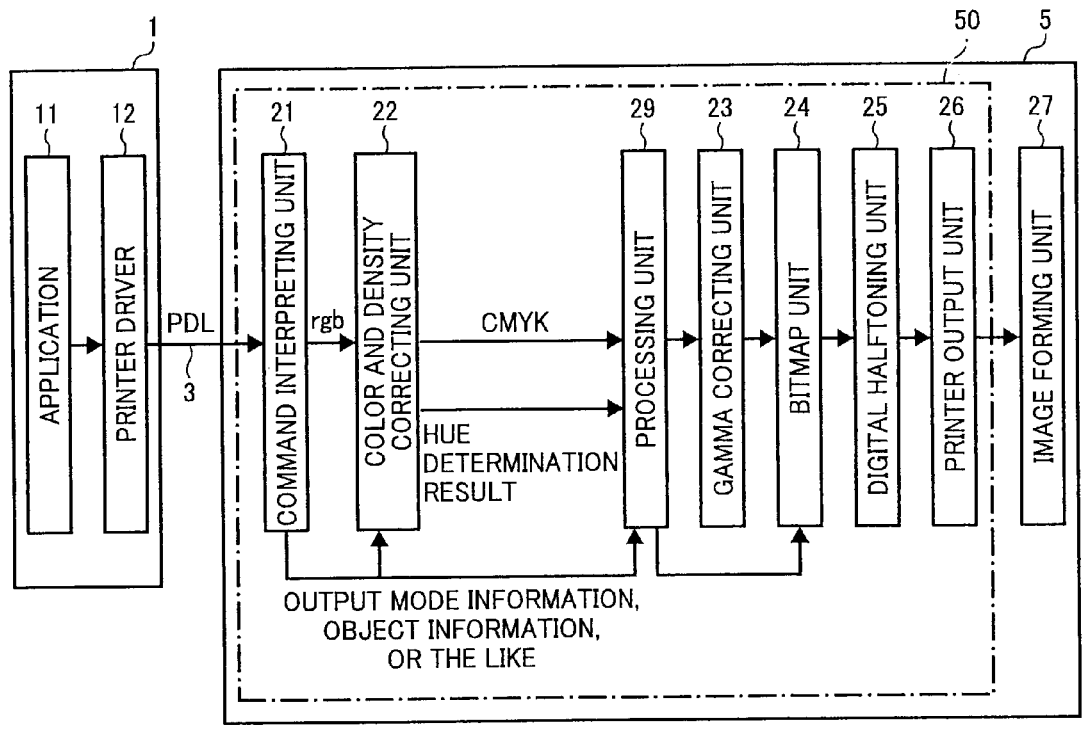
FIG. 22 is a block diagram of an image forming system including a printer having an image processing apparatus according to a third embodiment of the present invention.

FIG. 22 is a block diagram of an image forming system including a printer 5 having an image processing apparatus 50 according to a third embodiment of the present invention. The same components are indicated with the same reference numerals as those shown in FIGS. 1 and 13. The density correction performed in the first embodiment and the processing operation other than the density correction performed in the second embodiment are performed in combination in the image forming system shown in FIG. 13. If color characters in a plurality of colors are converted into black characters, a different processing means is applied depending on the color of the color characters, so that it is possible to clearly recognize color difference and make the color characters more noticeable than the black characters.

Figure 23:
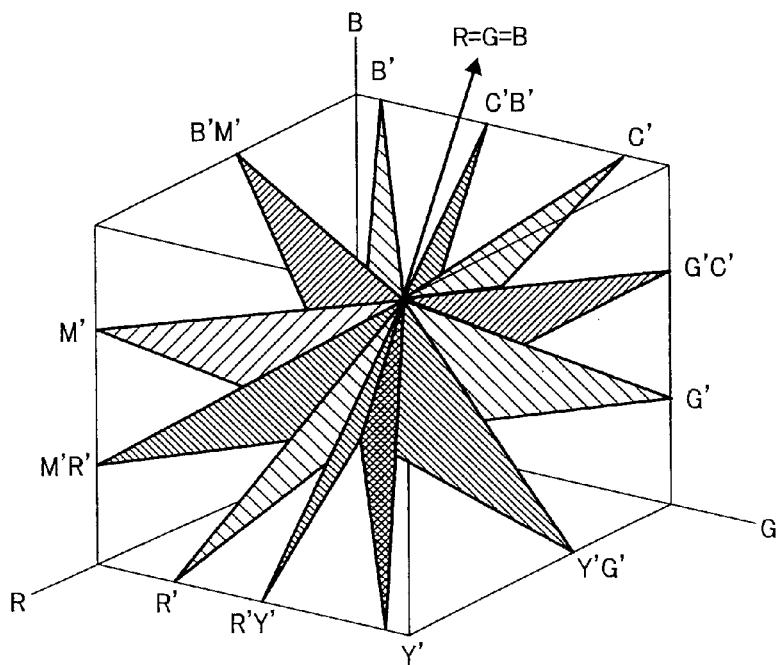
FIG. 23 is a schematic diagram for explaining determination as to which one of 12 divided areas in an RGB three-dimensional space includes input RGB values according to the third embodiment.

FIG. 23 is a schematic diagram for explaining determination as to which one of 12 divided areas in an RGB three-dimensional space includes input RGB values. The RGB three-dimensional space is divided into the 12 areas at 14 control points, i.e., control points R'Y', Y'G', G'C', C'B', B'M', and M'R' in addition to the control points K, W, R', G', B', C', M', and Y'. For example, if the divided area defined by the control points K, W, Y', and Y'G' includes the input RGB values, it is determined that a Y-YG hue includes the input RGB values. In the same manner as the hue determination by using the 6 divided areas as described in the first embodiment, it is determined which one of the hues corresponding to the 12 divided areas includes the input RGB values by using the hue determination conditions derived from the equations of the planes corresponding to the respective hue boundaries. Because the masking unit 22-3 performs the masking operation by selecting the masking coefficient for each of the hues corresponding to the six divided areas in the same manner as in the first embodiment, a determination result obtained by organizing a hue determined based on the 12 divided areas into a hue determined based on the 6 divided areas as described below is sent to the masking unit 22-3. Thus, the masking operation can be performed in the same manner as in the first embodiment. If the input RGB values belong to the Y-YG hue or a YG-G hue, it is determined that the Y-G hue includes the input RGB values, and if the input RGB values belong to a G-GC hue or a GC-C hue, it is determined that a G-C hue includes the input RGB values. Furthermore, if the input RGB values belong to a C-CB hue or a CB-B hue, it is determined that a C-B hue includes the input RGB values, and if the input RGB values belong to a B-BM hue or a BM-M hue, it is determined that a B-M hue includes the input RGB values. Moreover, if the input RGB values belong to an M-MR hue or an MR-R hue, it is determined that an M-R hue includes the input RGB values, and if the input RGB values belong to an R-RY hue or an RY-Y hue, it is determined that an R-Y hue includes the input RGB values.

The processing unit 29 uses a determination result obtained by organizing a hue determined based on the 12 divided areas into a hue determined based on the 6 divided areas in a manner different from that used for the masking operation. A determination result described below is sent to the processing unit 29. If the input RGB values belong to the YG-G hue or the G-GC hue, it is determined that a G hue includes the input RGB values, and if the input RGB values belong to the GC-C hue or the C-CB hue, it is determined that a C hue includes the input RGB values. Furthermore, if the input RGB values belong to the CB-B hue or the B-BM hue, it is determined that a B hue includes the input RGB values, and if the input RGB values belong to the BM-M hue or the M-MR hue, it is determined that an M hue includes the input RGB values. Moreover, if the input RGB values belong to the MR-R hue or the R-RY hue, it is determined that an R hue includes the input RGB values, and if the input RGB values belong to the RY-Y hue or the Y-YG hue, it is determined that a Y hue includes the input RGB values.

FIG. 24 is a table for explaining brightness correction values applied to a character object upon the density correction performed by the color and density correcting unit 22. If two colors of, for example, black and red are selected for the two-color output, the brightness correction values shown in FIG. 24 are applied to the character object. In the case of the two colors of black and red, characters in yellow, green, cyan, and blue are converted into characters in black. According to the brightness correction values shown in FIG. 24, the characters in green and black are converted into the characters in black (grey) without density difference, and the characters in cyan and blue are converted into the characters in black without density difference. Although it is easy to apply the different brightness correction values, it is difficult to represent the color difference by the density difference because visual color difference is subtle and unclear. Therefore, instead of representing all of the color differences only by the density difference, the color difference is represented by the processing operation performed by the processing unit 29 in addition to the density difference.

Figure 26:
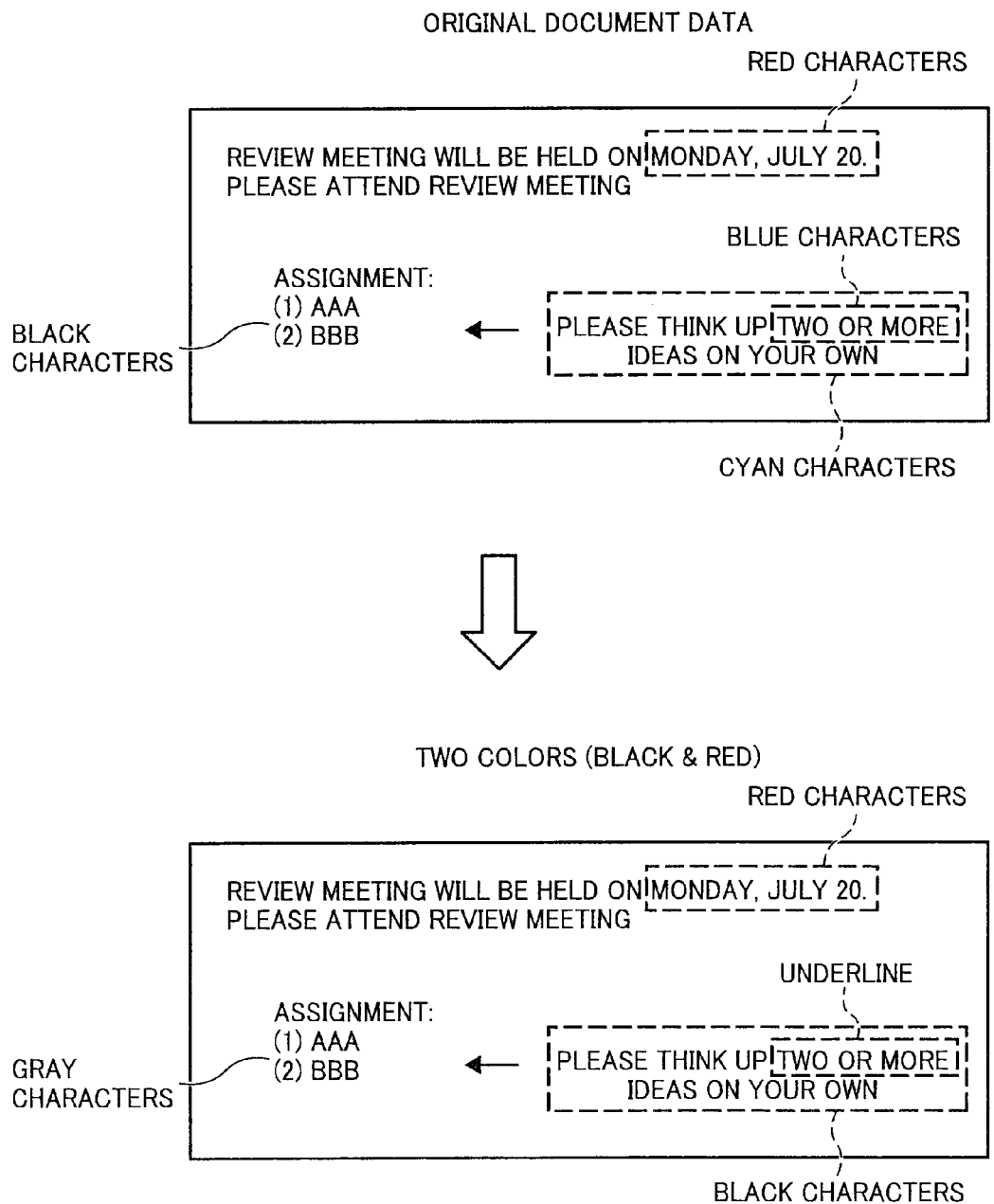
FIG. 26 is a schematic diagram for explaining an example of processing performed by the image processing apparatus according to the third embodiment.

FIG. 25 is a table for explaining processing methods employed by the processing unit 29 depending on a hue determination result. A processing method is determined in advance for each of the hues and a processing operation is performed depending on the processing method by the processing unit 29. With respect to the green and black characters represented in black without density difference by the previously performed density correction, the green characters converted into the black characters are represented in the italic typeface, so that the user can clearly recognize the black characters originally written in green and the black characters originally written in black. With respect to the cyan and blue characters, the blue characters converted into the black characters are underlined, so that the user can clearly recognize the black characters originally written in cyan and the black characters originally written in blue. FIG. 26 is a schematic diagram for explaining an example of processing performed by the image processing apparatus 50. If a document including cyan and blue characters is output in two colors of black and red, it is possible to clearly recognize the black characters originally written in cyan and the black characters originally written in blue on an output image.

As described above, because the density correction and the processing operation other than the density correction are performed in combination, the processing operation is performed on the color characters in a plurality of colors that are converted into the black characters depending on the color of the color characters by using the different processing method. Thus, it is possible to maintain, even upon the two-color output, the highlighting effect generated by the color characters converted into the black characters as well as the highlighting effect generated by the color characters converted into the characters in a color other than black, and to clearly represent the color difference between a plurality of colors that is difficult to represent only by the density correction. Furthermore, because the density correction and the processing operation other than the density correction are performed in combination, it is effective in reducing the color material to be used at portions corresponding to the black characters upon the density correction, and it is possible to achieve the effect of saving the color material in a document including a large number of black characters.

Although it is explained in the third embodiment that the density correction and the processing operation other than the density correction are performed in combination, it is possible that only the processing operation other than the density correction is performed and the different processing method is employed depending on the color, so that the difference between the color characters in a plurality of colors that are converted into the black characters can be recognized. There is an advantage that, if the density correction and the processing operation other than the density correction are performed in combination, variations of processing are increased and it becomes easier to deal with a plurality of colors.

Figure 27:
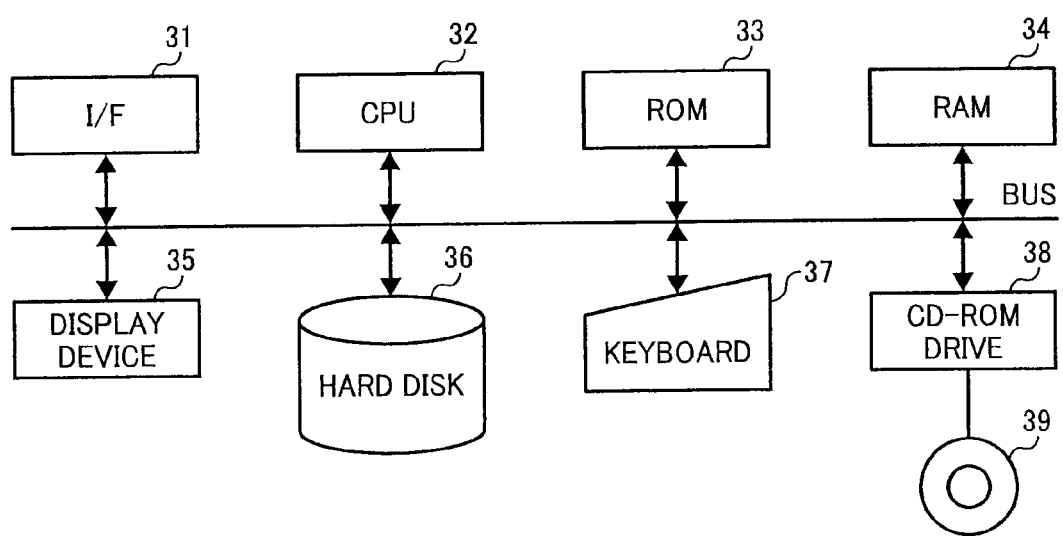
FIG. 27 is a block diagram of a specific apparatus for activating a computer program for executing image processing methods according to the embodiments.

FIG. 27 is a block diagram of a specific apparatus for activating a computer program for executing image processing methods according to the embodiments. Specifically, it shows hardware configured by a microprocessor, and the like, that is caused to execute software according to the image processing method. An image processing system includes an interface (I/F) 31, a central processing unit (CPU) 32, a read-only memory (ROM) 33, a random access memory (RAM) 34, a display device 35, a hard disk drive 36, a keyboard 37, and a compact disc read only memory (CD-ROM) drive 38. A general-purpose processing apparatus is prepared, and a computer program for executing the image processing method is stored in a computer-readable recording medium 39 such as a CD-ROM by the general-purpose processing apparatus. Furthermore, a control signal is input from an external device via the I/F 31, and the computer program according to the embodiment is activated in response to an instruction received from an operator via the keyboard 37 or automatically. The CPU 32 performs a control operation required by the image processing method in accordance with the computer program, stores a processing result in a storage device, such as the RAM 34 or the hard disk drive 36, and outputs the processing result to the display device 35 as required. Thus, it is possible to configure a control system in a general manner by using the recording medium in which the computer program for executing the image processing method is stored without changing an existing system.

The present invention is not limited to the embodiments. Various modifications and substitutions can be made without departing from the scope of the invention.

According to one aspect of the present invention, after a document image including the black characters and the color characters in a plurality of colors is converted into a document image in two colors, it is possible to maintain the highlighting effect generated by the color characters converted into the black characters as well as the highlighting effect generated by the color characters converted into the characters in a color other than black.

Furthermore, according to another aspect of the present invention, it is possible to achieve an effect of saving a consumed amount of toner in a generally used document that contains more black characters than color characters upon two-color output.

Moreover, according to still another aspect of the present invention, it is possible to configure a control system in a general manner without changing an existing system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
    a determining unit configured to determine a color of a character;
    a color converting unit configured to convert color data into two-color data having a black color and a predetermined color based on the color of the character; and
    a processing unit configured to process a black character determined by the determining unit, wherein
    the color converting unit is configured to convert a chromatic color having a predetermined hue into the predetermined color and a chromatic color having a hue other than the predetermined hue and an achromatic color into the black color, and
    the processing unit is configured to perform a predetermined process on the black character such that the color character having the chromatic color converted into the black color is relatively noticeable to the black character.

2. The image processing apparatus according to claim 1, wherein the predetermined process is changing at least one of a density, a size, and a thickness of the black character.

3. The image processing apparatus according to claim 1, wherein the predetermined process is any one of making the black character in an italic typeface, underlining the black character, a shading process on the black character, and a shadowing process on the black character.

4. The image processing apparatus according to claim 1, wherein the processing unit is further configured to process the black character such that an amount of a color material used for the black character is saved.

5. An image processing method for an image processing apparatus including a determining unit configured to determine a color of a character, a color converting unit configured to convert color data into two-color data having a black color and a predetermined color based on the color of the character, and a processing unit configured to process a black character determined by the determining unit, the image processing method comprising:
    converting including the color converting unit converting a chromatic color having a predetermined hue into the predetermined color and a chromatic color having a hue other than the predetermined hue and an achromatic color into the black color; and
    processing including the processing unit performing a predetermined process on the black character such that the color character having the chromatic color converted into the black color is relatively noticeable to the black character.

6. The image processing method according to claim 5, wherein the predetermined process is changing at least one of a density, a size, and a thickness of the black character.

7. The image processing method according to claim 5, wherein the predetermined process is any one of making the black character in an italic typeface, underlining the black character, a shading process on the black character, and a shadowing process on the black character.

8. The image processing method according to claim 5, wherein the processing further includes the processing unit processing the black character such that an amount of a color material used for the black character is saved.

9. A non-transitory computer-readable storage medium including computer executable instructions, wherein the instructions, when executed by a computer, cause the computer to perform an image processing method for an image processing apparatus including a determining unit configured to determine a color of a character, a color converting unit configured to convert color data into two-color data having a black color and a predetermined color based on the color of the character, and a processing unit configured to process a black character determined by the determining unit, the image processing method comprising:

converting including the color converting unit converting a chromatic color having a predetermined hue into the predetermined color and a chromatic color having a hue other than the predetermined hue and an achromatic color into the black color; and processing including the processing unit performing a predetermined process on the black character such that the color character having the chromatic color converted into the black color is relatively noticeable to the black character.

10. The non-transitory computer-readable storage medium according to claim 9, wherein the predetermined process is changing at least one of a density, a size, and a thickness of the black character.

11. The non-transitory computer-readable storage medium according to claim 9, wherein the predetermined process is any one of making the black character in an italic typeface, underlining the black character, a shading process on the black character, and a shadowing process on the black character.

12. The non-transitory computer-readable storage medium according to claim 9, wherein the processing further includes the processing unit processing the black character such that an amount of a color material used for the black character is saved.

* * * * *